(12) United States Patent
Zhu et al.

(10) Patent No.: US 9,001,660 B1
(45) Date of Patent: Apr. 7, 2015

(54) SELECTIVE DISCARD OF DIAMETER PROTOCOL MESSAGES

(71) Applicant: Sprint Communications Company L.P., Overland Park, KS (US)

(72) Inventors: Lei Zhu, Overland Park, KS (US); Daniel J. Pope, Overland Park, KS (US); Bharath Reddy Medarametla Lakshmi, Redmond, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 142 days.

(21) Appl. No.: 13/747,193

(22) Filed: Jan. 22, 2013

(51) Int. Cl.
*H04L 12/833* (2013.01)
(52) U.S. Cl.
CPC .................................. *H04L 47/2458* (2013.01)
(58) Field of Classification Search
None
See application file for complete search history.

(56) References Cited

U.S. PATENT DOCUMENTS

| | | | |
|---|---|---|---|
| 6,539,425 B1 * | 3/2003 | Stevens et al. | 709/220 |
| 2006/0187841 A1 * | 8/2006 | Palmer | 370/236 |
| 2011/0040845 A1 * | 2/2011 | Cai et al. | 709/206 |
| 2011/0158090 A1 * | 6/2011 | Riley et al. | 370/230 |
| 2011/0200053 A1 | 8/2011 | Kanode et al. | |
| 2011/0202612 A1 * | 8/2011 | Craig et al. | 709/206 |
| 2011/0202676 A1 * | 8/2011 | Craig et al. | 709/238 |
| 2013/0039176 A1 * | 2/2013 | Kanode et al. | 370/230 |
| 2013/0173823 A1 * | 7/2013 | Mann | 709/240 |

* cited by examiner

*Primary Examiner* — Anh-Vu Ly
*Assistant Examiner* — Hashim Bhatti

(57) ABSTRACT

Embodiments disclosed herein provide systems and methods for selectively discarding Diameter protocol messages in an LTE communication system. In a particular embodiment, a method provides receiving a plurality of Diameter protocol messages at the communication control system and determining a measure of Diameter message congestion. If the measure of Diameter message congestion satisfies a congestion criteria, the method provides determining a priority of at least one message of the plurality of Diameter protocol messages. Messages associated with communication sessions participating in a data session have higher priority than messages associated with communication sessions currently establishing and the messages associated with communication sessions currently establishing have higher priority than messages associated with initiating communication sessions. The method further provides selectively discarding the at least one message based on the priority of the at least one message relative to priorities of other messages of the plurality of Diameter protocol messages.

20 Claims, 5 Drawing Sheets

SELECTIVE DISCARD OF DIAMETER PROTOCOL MESSAGES

TECHNICAL BACKGROUND

The Diameter protocol is an authentication, authorization, and accounting protocol for use in communication networks. In particular, Long Term Evolution (LTE) communication networks may use the Diameter protocol to exchange messages between its systems. The systems participate in the provision of wireless communication services to wireless communication devices. For example, one system may authorize the devices to use the network and another may handle billing for the communication services, while other systems control other aspects of service provisioning.

As more devices access the LTE network, more Diameter protocol messages are exchanged between the systems to control access to the network for those devices. If the amount of messages reaches a great enough number, then the links connecting the systems may become too congested for all of the messages to transfer successfully. Likewise, the processing abilities of the systems themselves may become too congested to process all of the messages. If the network is too congested for all the messages, then some of the messages may be discarded due to the LTE network's inability to transfer and/or process those messages.

Overview

Embodiments disclosed herein provide systems and methods for selectively discarding Diameter protocol messages in an LTE communication system. In a particular embodiment, a method provides receiving a plurality of Diameter protocol messages at the communication control system and determining a measure of Diameter message congestion. If the measure of Diameter message congestion satisfies a congestion criteria, the method provides determining a priority of at least one message of the plurality of Diameter protocol messages. Messages associated with communication sessions participating in a data session have higher priority than messages associated with communication sessions currently establishing and the messages associated with communication sessions currently establishing have higher priority than messages associated with initiating communication sessions. The method further provides selectively discarding the at least one message based on the priority of the at least one message relative to priorities of other messages of the plurality of Diameter protocol messages.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
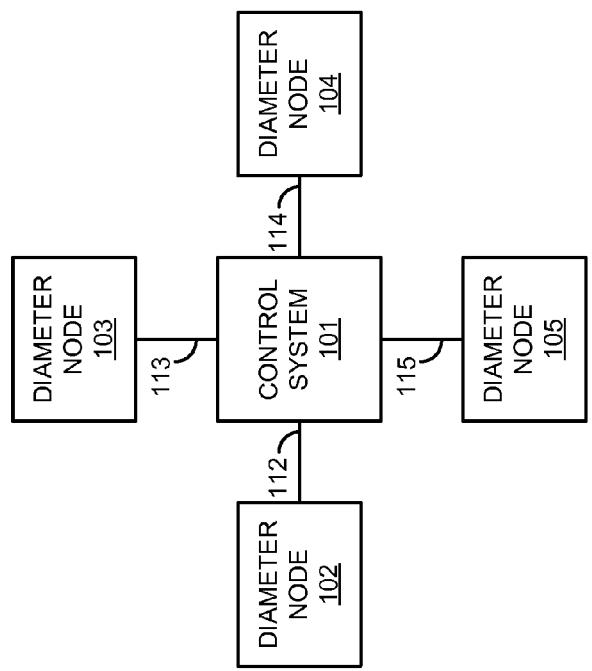
FIG. 1 illustrates a LTE communication system for selectively discarding diameter protocol messages.
Figure 1:

FIG. 1 illustrates Long Term Evolution (LTE) communication system 100. LTE communication system 100 includes communication control system 101 and Diameter protocol nodes 102-105. Communication control system 101 and Diameter protocol nodes 102-105 communicate over communication links 112-115, respectively.

In operation, Diameter nodes 102-105 are different systems and devices within LTE system 100 that communicate with each other using the Diameter authentication, authorization, and accounting protocol. While LTE system 100 is shown to only comprise four Diameter nodes, it should be understood that LTE system 100 could include additional Diameter nodes or fewer Diameter nodes depending on what functionality is required by LTE system 100.

LTE system 100 uses the Diameter protocol to control access for devices that are capable of communicating over LTE system 100. Messages transferred between Diameter nodes 102-105 facilitate the setting up of communication sessions, the controlling of those communication sessions, and the tearing down of the communication sessions. In particular, the Diameter protocol messages may allow for the transferal of information between Diameter nodes 102-105, such as device authentication information, billing information, session rule information, or any other information that may be transferred using the Diameter protocol.

When LTE system 100 is under heavy Diameter message load, LTE system 100 may not be able to transfer or process at least a portion of the Diameter messages transferred between Diameter nodes 102-105 during the period of heavy load. The inability to transfer or processes a portion of the Diameter messages may cause LTE system to discard messages indiscriminately. Hence, Diameter messages may be discarded without considering the impact each message will have on a communication session associated with each message.

Figure 2:
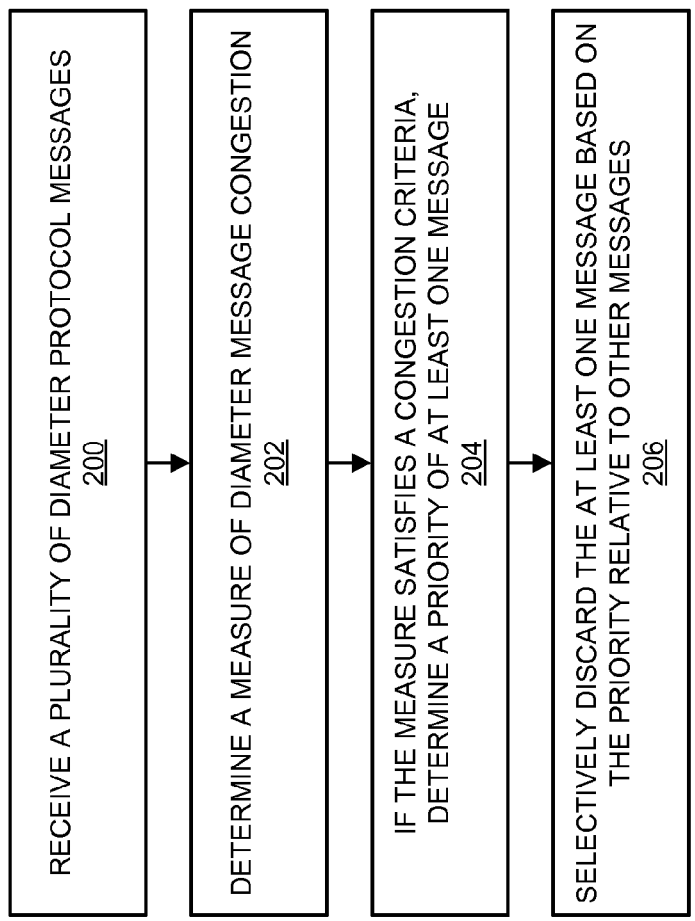
FIG. 2 illustrates the operation of the LTE communication system for selectively discarding diameter protocol messages.

FIG. 2 illustrates the operation of LTE communication system 100 for selectively discarding Diameter protocol messages. LTE communication system 100 includes communication control system 101 that controls the routing of Diameter protocol messages between the Diameter nodes 102-105. Control system 101 is configured to receive a plurality of Diameter protocol messages (step 200). The Diameter messages may be any type of message defined by the Diameter protocol and be directed from one of Diameter nodes 102-105 to another of Diameter nodes 102-105. Thus, control system 101 acts as a middleman system for Diameter messages between Diameter nodes 102-105.

Control system 101 also determines a measure of Diameter message congestion in LTE system 100 (step 202). The Diameter message routing congestion may be an aggregate measure of message load on communication links 112-115, an aggregate measure of processing load on Diameter nodes 102-105, or a combination of both link and processing congestion measures. Alternatively, control system may determine a link congestion measure on each individual communication link 112-115 and, likewise, may determine a processing congestion measure for each individual Diameter node. The Diameter message congestion may be expressed as a load value, such as an amount of messages per unit time, a percentage of total load capacity, a number of messages waiting for transmittal or processing, or any other possible value that can represent message load on communication links and/or processing nodes. Control system 101 may continuously or periodically determine the measure of Diameter message congestion so as to ensure an updated measurement value.

If the measure of Diameter routing congestion satisfies a congestion criteria, the control system 101 determines a priority of at least one message of the plurality of Diameter protocol messages (step 204). The congestion criteria may be any type of criteria that, if satisfied, would indicate that one or more Diameter messages should be discarded in order to control congestion. For example, the congestion criteria may be a threshold congestion value that is satisfied when the value of the measure of Diameter message congestion exceeds the threshold.

If the measure of Diameter message congestion includes measures for individual links 112-115 and/or individual Diameter nodes 102-105, then control system 101 may determine whether the congestion criteria is satisfied based on the Diameter node to which the at least one message is directed and/or communication link on which the at least one message will travel. For example, if the at least one message is directed to Diameter node 103, then the congestion criteria is satisfied if the congestion measures for link 113 and/or Diameter node 103 satisfy congestion criteria for link 113 and node 103, respectively.

The priority of the at least one message relative to other Diameter messages is generally based upon the status of a communication session associated with the at least one message for a device to which LTE system 100 provides network access using one or more of Diameter nodes 102-105. For example, the at least one message may be to initiate a new communication session. Therefore, the communication session associated with the at least one message is a communication session whose initiation has been requested. Communication sessions of this type are considered initiating and have not yet began the processes of establishing the communication session for exchanging communications. Similarly, the at least one message may also correspond to a communication session that has been initiated so as not to be considered initiating but is also not yet setup to the point of allowing a device to exchange data communications or to a communication session that has been established and is currently allowing a device to exchange data communications over LTE system 100. Accordingly, the priority of the at least one message is lowest for a newly initiating communication session and increases until highest priority is achieved for established communication sessions.

In a specific example of the above priority, messages associated with communication sessions participating in a data session have higher priority than messages associated with communication sessions currently establishing and messages associated with communication sessions currently establishing have higher priority than messages associated with initiating communication sessions.

After determining the priority of the at least one message, control system 101 selectively discards the at least one message based on the priority of the at least one message relative to priorities of other messages of the plurality of Diameter protocol messages (step 206). For example, if the priority of the at least one message is lower than or equal to the priorities of the other Diameter messages, then control system 101 discards the at least one message. Alternatively, if the priority of the at least one message is lower than or equal to the priorities of the other Diameter messages, then control system 101 may discard the at least one message and other messages with the same priority on a last in first out (LIFO) basis. Thus, the at least one message will only be discarded after messages of equal priority that arrived after the at least one message are discarded.

In some embodiments, if the at least one message is discarded, then control system 101 may transfer a message indicating that the at least one message could not be processed. The message may be transferred to the Diameter node from where the at least one message originated and/or to any other interested Diameter node. The message may be transferred in the form of a Diameter Extensible Authentication Protocol Answer (DEA) message with the Result-Code AVP (Attribute Value Pair) setting to DIAMETER_UNABLE_TO_DELIVER.

In further embodiments, control system 101 may further selectively discard the at least one message based on the priority of the communication session associated with the at least one message. For example, while the priority of the at least one message may indicate that the at least one message should be discarded, the priority of the communication session associated with the at least one message may indicate that the at least one message should not be discarded. The priority of the communication session may indicate that the at least one message should not be discarded if the priority of the communication session satisfies a priority threshold, which may adjust based on the priority of the at least one message. For example, if the at least one message has the lowest priority, then the communication session may need to be of the highest priority in order for the at least one message to not be discarded. Similarly, if the at least one message has a midrange priority, then the communication session priority may not need to be as high for the at least one message to not be discarded.

The priority of the communication session may be based on the type of communication session. Communication sessions deemed to be of higher importance may receive higher priorities. For example, a communication session participating in a VoIP call may have a higher priority than a communication session retrieving a web page. An administrator of LTE system 100 may define the priorities of varying types of communication sessions. Alternatively, the priority of the communication session may be based on a service level associated with the communication session. The service level may be based on the preferences of a subscriber to the services of LTE system 100. For example, a subscriber may pay extra fees to the operator of LTE system 100 in order to for the subscriber's communication session to receive higher priority than other communication sessions. Control system 100 may access a subscriber profile information database to determine the priority level for communication sessions associated with certain subscribers.

Advantageously, as the method of FIG. 2 is applied to all Diameter messages transferred through control system 101, control system 101 is able to discard lower priority messages before higher priority messages when congestion is high enough to make message discarding necessary.

Referring back to FIG. 1, communication control system 101 comprises a computer system and communication interface. Communication control system 101 may also include other components such as a router, server, data storage system, and power supply. Communication control system 101 may reside in a single device or may be distributed across multiple devices. Communication control system 101 could be a diameter routing agent, network gateway system, authentication and authorization platform, Internet access node, application server, service node, or some other communication system—including combinations thereof.

Diameter protocol nodes 102-105 each comprise a computer system and communication interface. Diameter protocol nodes 102-105 may also include other components such as a router, server, data storage system, and power supply. Diameter protocol nodes 102-105 could each respectively be a Mobility Management Entity (MME), Home Subscriber Server (HSS), Serving Gateway (SGW), Equipment Identity Register (EIR), Packet Data Network Gateway (PGW), Policy and Charging Rules Function (PCRF) server, or another other type of communication node that communicates using the Diameter protocol.

Communication control system 101 is shown externally to Diameter nodes 102-105, but the functionality of control system 101 could be integrated within the components of one or more of Diameter nodes 102-105.

Communication links 112-115 use metal, glass, air, space, or some other material as the transport media. Communication links 112-115 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-115 could be direct links or may include intermediate networks, systems, or devices.

Figure 3:
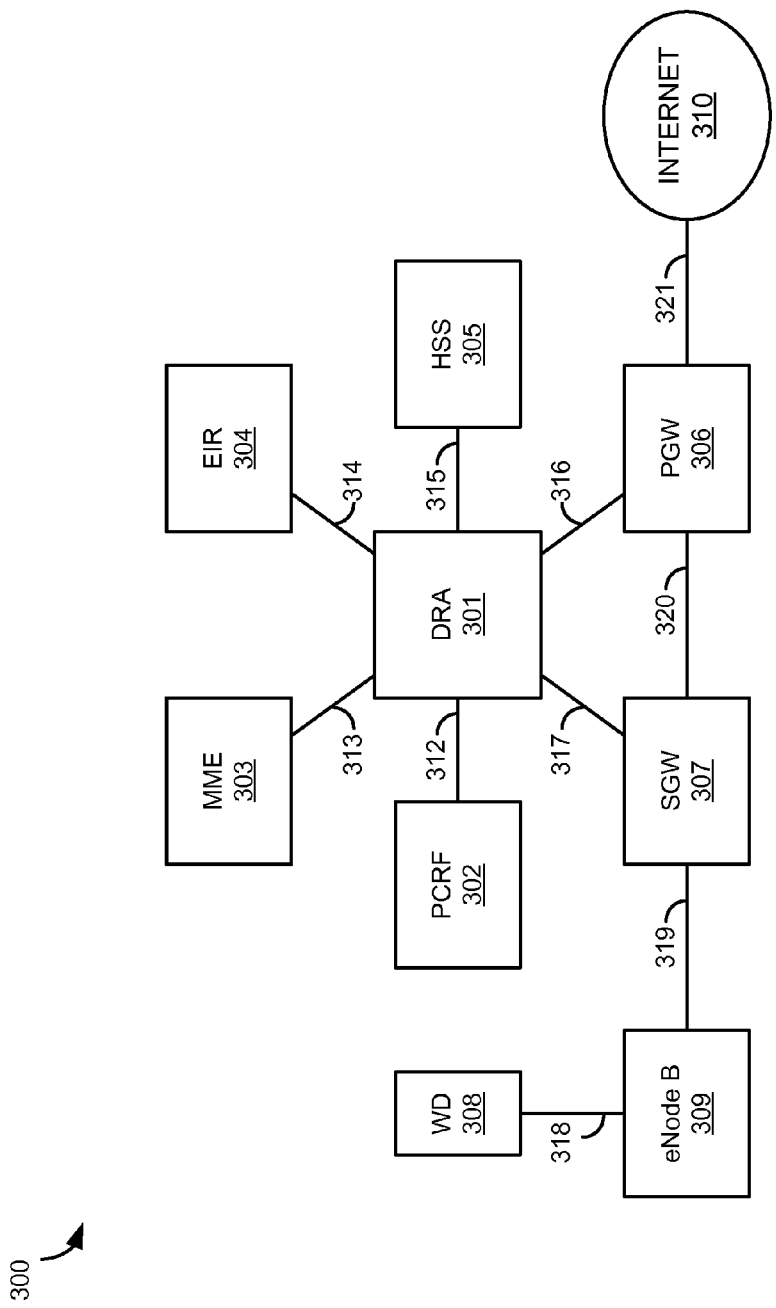
FIG. 3 illustrates a LTE communication system for selectively discarding diameter protocol messages.

FIG. 3 illustrates Long Term Evolution (LTE) communication system 300. LTE communication system 300 includes Diameter Routing Agent (DRA) 301, Policy and Charging Rules Function (PCRF) server 302, Mobility Management Entity (MME) 303, Equipment Identity Register (EIR) 304, Home Subscriber Server (HSS) 305, Packet Data Network Gateway (PGW) 306, Serving Gateway (SGW) 307, wireless communication device 308, eNodeB 309, and Internet 310. Communication links 312-317 allow systems 302-307 to exchange Diameter protocol messages through DRA 301. Communication links 318-321 allow wireless device 308 to exchange data communications with Internet 310 during established communication sessions.

While not shown, LTE system 300 may further include other systems, such as base stations and additional eNodeBs, for providing LTE communication services to wireless device 308 and other wireless devices. Additionally, LTE system 300 may further include other Diameter protocol systems that are part of communication networks using wireless standards other than LTE. These systems may be in cooperation with the LTE network of LTE system 300 to provide communication services to multi-modal devices. For example, LTE system 300 may include systems that are part of a Code Division Multiple Access (CDMA) 3G network, a Universal Mobile Telecommunications System (UMTS), a WiFi network, or some other type of network that can use the Diameter protocol. These other types of networks may include Diameter capable systems that include High Speed Packet Data Serving Gateways (HSGWs), Authentication, Authorization, and Accounting (AAA) servers, and Evolved Packet Data Gateways, among others.

In operation, LTE system 300 provides data communication services to wireless devices. Those communication services may include access to Internet 310 via eNodeB 309, SGW 307, and PGW 306. In order for LTE system 300 to provide such a communication service to a wireless device like wireless device 308, the systems 302-307 need to communicate with each other to set up a communication session for the service. The Diameter protocol is used for the communications between systems 302-307. The Diameter messages exchanged between systems 302-307 contain information regarding whether wireless device 308 is authorized to access LTE system 300, any billing requirements for the communication session, rules for the communication session, and any other type of information necessary to properly provide the communication service to wireless device 308.

Figure 4:
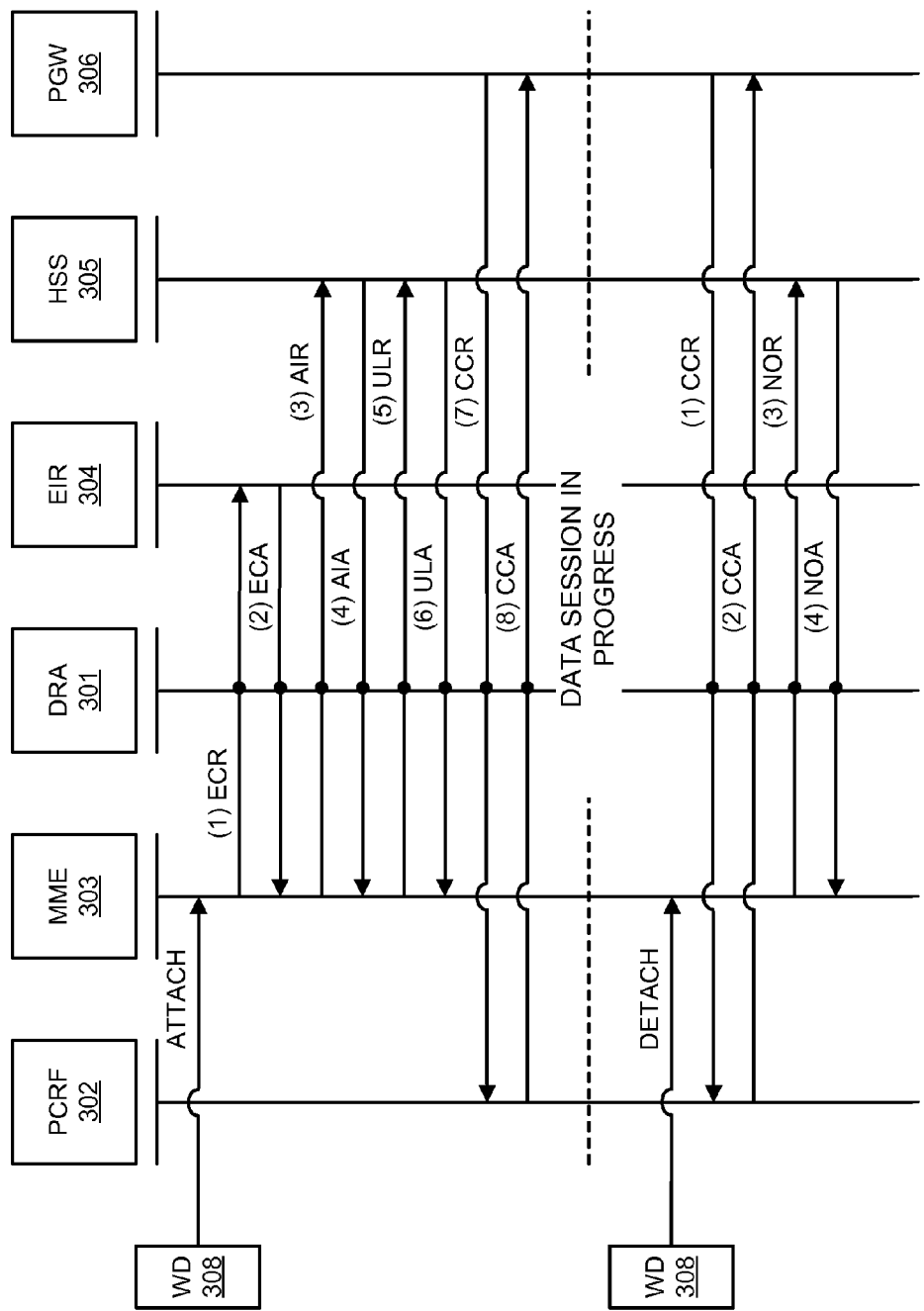
FIG. 4 illustrates a sequence diagram of exemplary Diameter protocol messages in the LTE communication system.

FIG. 4 illustrates a sequence diagram of exemplary Diameter protocol messages in LTE communication system 300. FIG. 4 includes a Mobile Equipment Identity Check Request (ECR) message, a Mobile Equipment Identity Check Answer (ECA) message, an Authentication Information Request (AIR) message, an Authentication Information Answer (AIA) message, an Update Location Request (ULR) message, an Update Location Answer (ULA) message, a Notify Request (NOR) message, a Notify Answer (NOA) message, Credit Control Request (CCR) messages, and Credit Control Answer (CCA) messages.

The messages shown in FIG. 4 are numbered with the lowest priority messages having the number (1) up to the highest priority messages having the number (8). The messages are all routed through DRA 301 so that DRA 301 can perform the method described in FIG. 2 with respect to the messages. In particular, DRA 301 monitors Diameter message congestion in LTE system 300. If DRA 301 determines that the congestion in LTE system 300 is such that Diameter messages will need to be discarded, then DRA 301 discards the messages in accordance with their priority.

In an example, wireless device 308 attaches to MME 303 to initiate a data communication session over LTE system 300. The systems 302-306 exchange Diameter messages numbered 1-8 to establish the communication session. The lower numbered messages are of lower priority because they are further away in the sequence from the completed establishment of the data session. Thus, if message discards are necessary, DRA 301 will favor messages for communication sessions that are closer to establishment. Likewise, though not shown, any Diameter messages exchanged while the data session is in progress are of the highest priority so that the data session does not drop in favor of the establishment of a different data session.

When wireless device 308 indicates an end to the data session, wireless device 308 detaches from MME 303. The messages after the detach are also numbered 1-4 because discarding Diameter messages after the data session has ended would also be favored over discarding Diameter messages of a session that is establishing or has been established. Hence, in some embodiments, the messages transferred after detach may be prioritized lower than the messages transferred after attach so that establishing sessions take priority.

Once DRA 301 determines that congestion warrants discarding messages, then DRA 301 may discard any of the Diameter messages associated with the data session of wireless device 308 if the Diameter messages are of lower priority than the Diameter messages of other communication sessions and devices. For example, if Diameter congestion is high enough to discard messages and DRA 301 receives the ULR message associated with the establishing data session of wireless device 308, then DRA 301 will discard the ULR message unless there are messages for other data sessions that have a priority lower than 5. If there are no messages of lower priority but there are other messages of priority 5, then DRA 301 discards most recently received message of priority 5. It should be further understood, that DRA 301 may need to delete many Diameter messages from many different communication sessions in order to control Diameter congestion. Thus, DRA 301 will continue to discard messages from lowest to highest priority to maintain congestion levels in LTE system 300.

Figure 5:
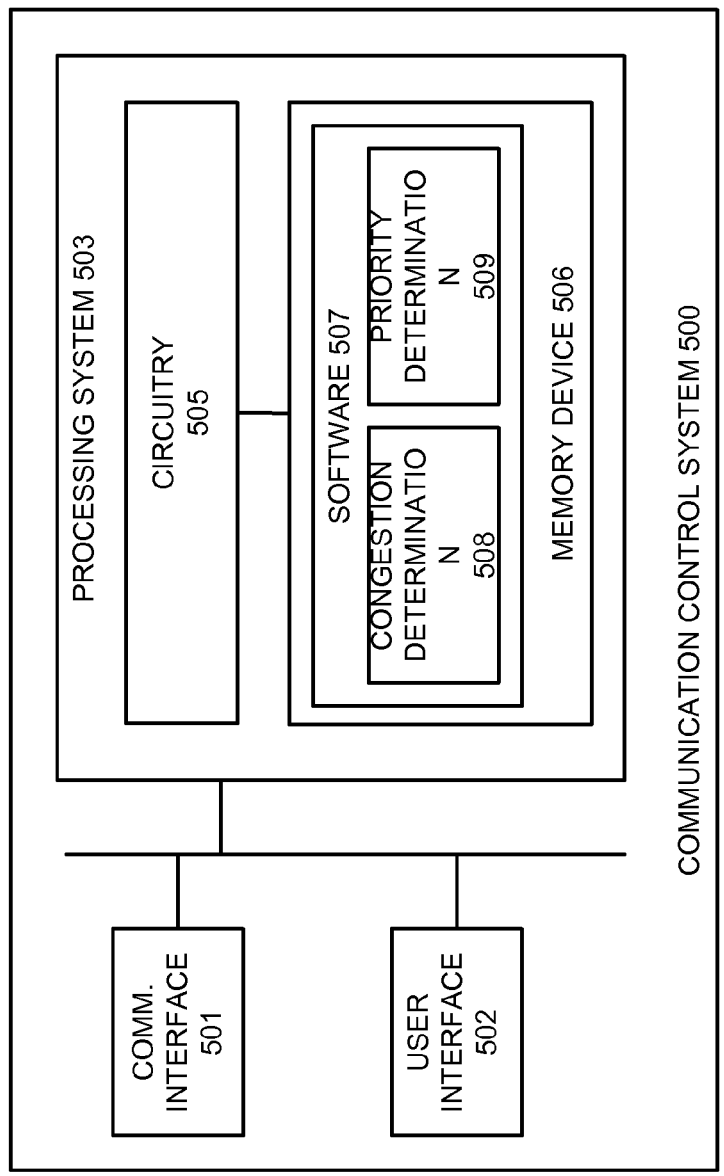
FIG. 5 illustrates a communication control system for selectively discarding diameter protocol messages.

FIG. 5 illustrates communication control system 500. Communication control system 500 is an example of communication control system 101, although control system 101 may use alternative configurations. Communication control system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes congestion determination module 508 and priority determination module 509. Operating software 507 may further include an operating system, utilities, drivers, network interfaces, applications, or some other type of software. When executed by circuitry 505, operating software 507 directs processing system 503 to operate communication control system 500 as described herein.

In particular, operating software 507 directs processing system 503 to receive a plurality of Diameter protocol messages via communication interface 501. Congestion determination module 508 directs processing system 503 to determine a measure of Diameter message congestion. If the measure of Diameter message congestion satisfies a congestion criteria, priority determination module 509 directs processing system 503 to determine a priority of at least one message of the plurality of Diameter protocol messages. The messages associated with communication sessions participating in a data session have higher priority than messages associated with communication sessions currently establishing and the messages associated with communication sessions currently establishing have higher priority than messages associated with initiating communication sessions. Operating software 507 further directs processing system 503 to selectively discard the at least one message based on the priority of the at least one message relative to priorities of other messages of the plurality of Diameter protocol messages.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication control system for facilitating the routing of Diameter protocol messages in a Long Term Evolution (LTE) communication system, comprising:
receiving a plurality of Diameter protocol messages at the communication control system;
determining a measure of Diameter message congestion;
if the measure of Diameter message congestion satisfies a congestion criteria, determining a priority of at least one message of the plurality of Diameter protocol messages, wherein:
messages associated with communication sessions participating in a data session have higher priority than messages associated with communication sessions currently establishing; and
the messages associated with communication sessions currently establishing have higher priority than messages associated with initiating communication sessions;
selectively discarding the at least one message based on the priority of the at least one message relative to priorities of other messages of the plurality of Diameter protocol messages.

2. The method of claim 1, wherein selectively discarding the at least one message based on the priority of the at least one message comprises:
determining whether the priority of the at least one message is lower than or equal to the priorities of the other messages; and
if the priority of the at least one message is lower than or equal to the priorities of the other messages, discarding the at least one message.

3. The method of claim 1, wherein selectively discarding the at least one message based on the priority of the at least one message comprises:
determining whether the priority of the at least one message is lower than or equal to the priorities of the other messages; and
if the priority of the at least one message is lower than or equal to the priorities of the other messages and no other messages of equal priority were received after the at least one message, discarding the at least one message.

4. The method of claim 1, wherein selectively discarding the at least one message based on the priority of the at least one message comprises:
determining whether the priority of the at least one message is lower than the priorities of the other messages;
determining a priority of a communication session associated with the at least one message;
if the priority of the at least one message is lower than or equal to the priorities of the other messages and the priority of the communication session associated with the at least one message satisfies a priority criteria, discarding the at least one message.

5. The method of claim 4, wherein the priority criteria is satisfied if the priority of the communication session does not meet a priority threshold.

6. The method of claim 4, wherein the priority of the communication session is based on a service level associated with the communication session.

7. The method of claim 6, wherein determining the priority of a communication session associated with the at least one message comprises:

retrieving the priority of a communication session from a subscriber profile associated with the communication session.

8. The method of claim 4, wherein the priority of the communication session is based on a communication session type for the communication session.

9. The method of claim 1, further comprising:
if the at least one message is selectively discarded, transferring a notification message indicating that the at least one message could not be processed.

10. The method of claim 1, wherein the Diameter message congestion corresponds a message processing load on a network element to which the at least one message is directed.

11. A communication control system for facilitating the routing of Diameter protocol messages in a Long Term Evolution (LTE) communication system, comprising:
a communication interface configured to receive a plurality of Diameter protocol messages at the communication control system;
a processing system configured to determine a measure of Diameter message congestion, if the measure of Diameter message congestion satisfies a congestion criteria, determine a priority of at least one message of the plurality of Diameter protocol messages, wherein:
messages associated with communication sessions participating in a data session have higher priority than messages associated with communication sessions currently establishing; and
the messages associated with communication sessions currently establishing have higher priority than messages associated with initiating communication sessions;
the processing system further configured to selectively discard the at least one message based on the priority of the at least one message relative to priorities of other messages of the plurality of Diameter protocol messages.

12. The communication control system of claim 11, wherein the processing system is configured to selectively discard the at least one message based on the priority of the at least one message by:
determining whether the priority of the at least one message is lower than or equal to the priorities of the other messages; and
if the priority of the at least one message is lower than or equal to the priorities of the other messages, discarding the at least one message.

13. The communication control system of claim 11, wherein the processing system is configured to selectively discard the at least one message based on the priority of the at least one message by:

determining whether the priority of the at least one message is lower than or equal to the priorities of the other messages; and
if the priority of the at least one message is lower than or equal to the priorities of the other messages and no other messages of equal priority were received after the at least one message, discarding the at least one message.

14. The communication control system of claim 11, wherein the processing system is configured to selectively discard the at least one message based on the priority of the at least one message by:
determining whether the priority of the at least one message is lower than the priorities of the other messages;
determining a priority of a communication session associated with the at least one message;
if the priority of the at least one message is lower than or equal to the priorities of the other messages and the priority of the communication session associated with the at least one message satisfies a priority criteria, discarding the at least one message.

15. The communication control system of claim 14, wherein the priority criteria is satisfied if the priority of the communication session does not meet a priority threshold.

16. The communication control system of claim 14, wherein the priority of the communication session is based on a service level associated with the communication session.

17. The communication control system of claim 16, wherein the processing system is configured to determine the priority of a communication session associated with the at least one message by:
retrieving the priority of a communication session from a subscriber profile associated with the communication session.

18. The communication control system of claim 14, wherein the priority of the communication session is based on a communication session type for the communication session.

19. The communication control system of claim 11, further comprising:
if the at least one message is selectively discarded, the communication interface configured to transfer a notification message indicating that the at least one message could not be processed.

20. The communication control system of claim 11, wherein the Diameter message congestion corresponds a message processing load on a network element to which the at least one message is directed.

* * * * *